Aug. 6, 1940.   E. T. PLATZ   2,210,870

CIRCUIT BREAKER

Original Filed July 23, 1937   3 Sheets-Sheet 1

INVENTOR.
Elwood T Platz
Daniel G. Cullen
BY   ATTORNEY.

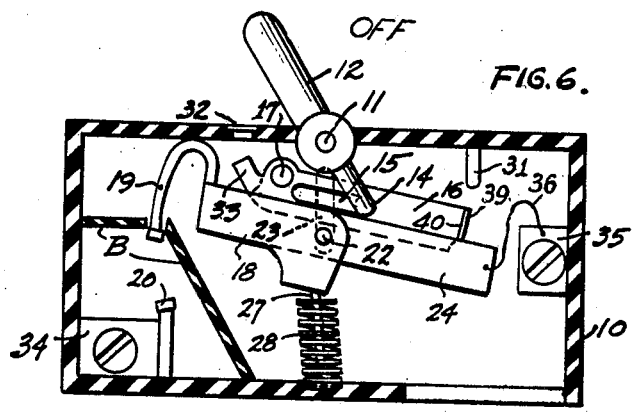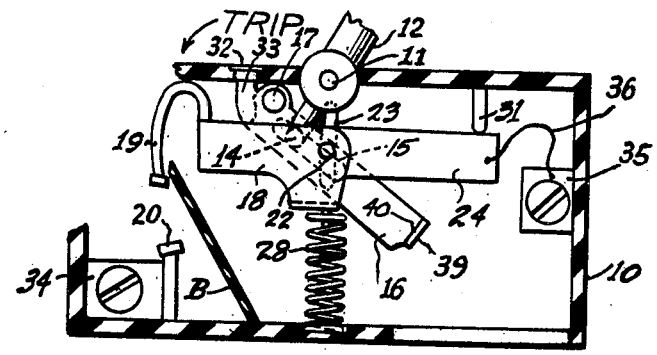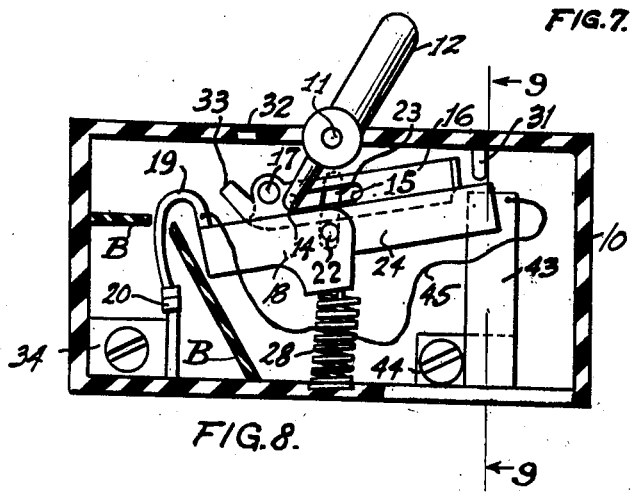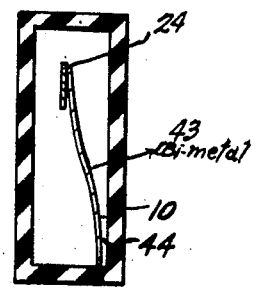

Aug. 6, 1940.  E. T. PLATZ  2,210,870
CIRCUIT BREAKER
Original Filed July 23, 1937  3 Sheets-Sheet 3
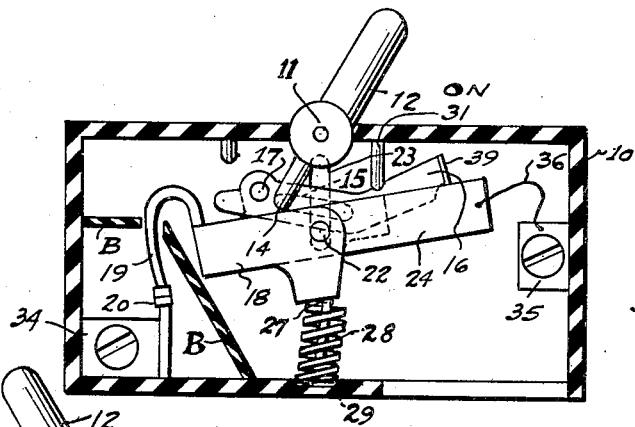
Fig. 10.
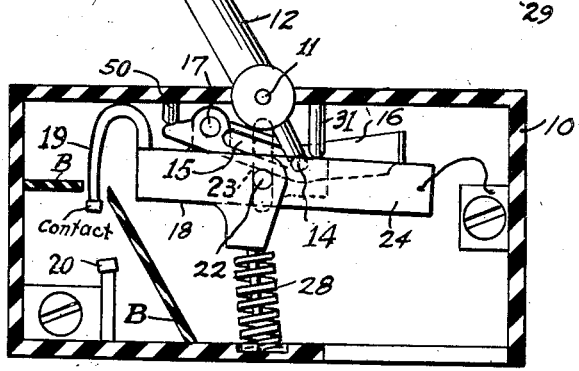
Fig. 11.
OFF —
FINAL TRIP
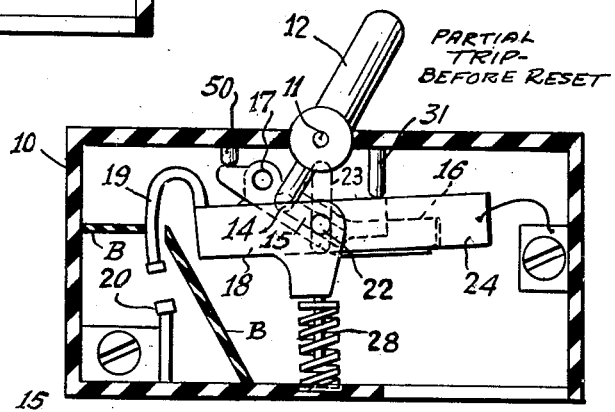
PARTIAL
TRIP-
BEFORE RESET
Fig. 12.
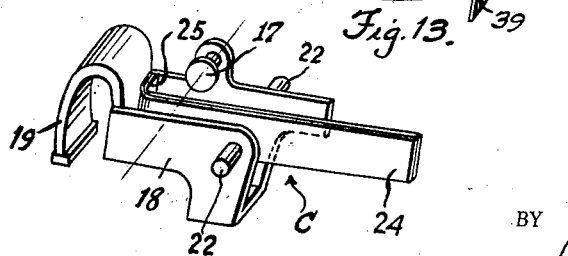
Fig. 14.
Fig. 13.
INVENTOR.
Elwood T. Platz
BY
Daniel G. Cullen
ATTORNEY.

Patented Aug. 6, 1940

2,210,870

UNITED STATES PATENT OFFICE 2,210,870

CIRCUIT BREAKER

Elwood T. Platz, Detroit, Mich.

Application July 23, 1937, Serial No. 155,277
Renewed July 31, 1939

13 Claims. (Cl. 200—116)

This application relates to circuit breakers.

Objects of the inventions hereof will best be understood upon reference to the drawings. In these drawings:

Fig. 6 is an elevation section with the breaker in "off" position;

Fig. 7 is a similar view with the breaker shown as "tripped";

Fig. 8 is a view like Fig. 1 of a modified form of breaker;

Fig. 9 is a section on line 9—9 of Fig. 8.

Figs. 10-14 are views like Figs. 1, 6, 7, 4, and 5 respectively of another form of breaker.

Figure 1:
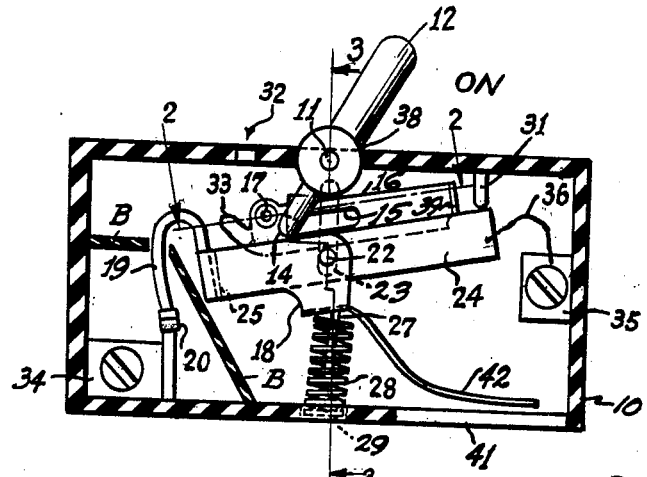
Fig. 1 is a sectional elevation of one form of breaker with the breaker shown in "on" position.

Referring to the drawings, it will be observed that the breaker of Figs. 1-7 includes a partially open bottom casing 10 in whose upper wall is journalled, on a pin 11, a breaker handle 12. The lower end of the handle is in the form of a finger 14 which is disposed within a slot 15 of a latch element 16, better described as an actuating bar, which is pivotally connected to a cradle C (Fig. 5) by means of a pin 17 in the cradle proper or contact arm 18 on whose end is the movable contact 19 of the breaker, the latter being arranged to mate with the stationary contact 20 of the breaker.

The cradle itself is provided with an axle formed of pins 22 whose ends are received within slots 23 in the side walls of the breaker, whereby the cradle may be moved up and down in the breaker casing and also whereby it may pivot on its axle 22. Within the cradle proper and alongside the actuating bar is a trip control element or latch 24, shown in Fig. 5 as bimetallic. This element is rigidly secured to the cradle proper by having its foot part 25 welded or otherwise integrally secured to the movable contact 19 which is also integrally secured to the cradle proper. Parts 18—19—24 all form the cradle.

In the lower surface of the cradle proper is formed a slot 26 in which is loosely but non-removably secured the upper or headed end of a tongue 27 whose lower end is telescoped within a coiled compression spring 28 whose lower end is seated within a seat 29 formed in the bottom wall of the breaker casing; the tongue 27 is free to pivot loosely with respect to the cradle.

Projecting downwardly from the top of the breaker casing is a stop 31 whose functions will later be described.

Also formed in the top wall of the breaker casing is a window opening 32 through which may be viewed a trip indicator extension 33 of the actuating bar 16.

Binding posts 34 and 35 in the breaker receive the circuit conductors and the circuit is established between these binding posts in the breaker through the mating contacts 20—19, the cradle proper 18, the controller 24, and a flexible connection 36 which connects the free end of the controller 24 to the binding posts 35.

The operation of the breaker is substantially as follows: Fig. 1 shows the breaker in "on" position.

When the handle is moved to the left (see Fig. 6), its finger 14 rides to the right in actuating bar slot 15 and urges the actuating bar to rotate clockwise on its pivot 17. The lower edge of the lug 39 of the actuating bar engages the controller 24, rigid with the cradle proper 18, and thus forces the entire cradle to rotate clockwise about contact 20 as a fulcrum, compressing the spring 28; after finger 14 passes over center the compressed spring 28 causes the cradle to rotate clockwise with a snap action to separate the movable contact from the stationary contact with a snap action.

Return of handle 12 to the "on" position similarly rocks the actuating bar and causes rocking of the cradle as a whole counterclockwise, also with a snap action.

Figure 3:
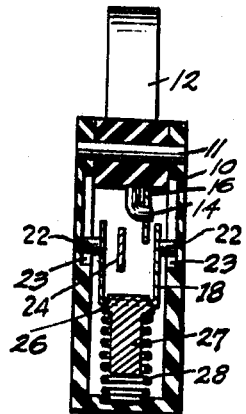
Fig. 3 is an end section on line 3—3 of Fig. 1.

On overload, bimetal element 24 warps to the left, Fig. 3, so as to release itself from under the lug 39 of actuating bar 16, whereupon spring 28 urges the entire cradle upwardly, without substantial rocking thereof, axle pins 22 riding upwardly in casing slots 23.

Movement is terminated by the engagement of the upper edge of the latch 24 with stop 31 and by engagement of the upper end of the movable contact 19 with the under surface of the casing top wall. Because handle 12 remains stationary, its finger also remaining stationary, actuating bar 16, instead of moving bodily upwardly with the cradle 18, rocks clockwise on finger 14 as a pivot, the pivotal connection 17 between the cradle 18 and the actuating bar 16 pulling the left hand end of the actuating bar upwardly so that its trip indicator extension 33 moves to the casing window opening 32 to indicate trip.

For "resetting" after "trip," handle 12 is moved manually to "off" from "tripped" or "on" position; such movement of handle 12, to the left from Fig. 7, will first cause actuating bar 16 to rotate counterclockwise on its pivot 17 and will then cause the cradle to move clockwise, to the position of Fig. 6; cooling of the bimetal controller 24 will return it automatically to its normal position. This, however, does not prevent return of the actuating bar 16 from the trip position of Fig. 7 to the "off" position of Fig. 6, when the handle is moved for resetting to such "off" position, because of the inclination of the edge 40 of the actuating bar lug 39, it being observed that for resetting the latch 16 and controller 24 move towards and pass each other, scissors fashion, with the controller 24 riding on the bias cut edge 40 of the actuating bar lug 39. Reset terminates with the handle and all other parts in the "off" position of Fig. 6.

While actuating bar lug 39 is shown as integral with actuating bar 16, it is understood that it will be made as a separate piece, insulatedly mounted on the end of actuating bar 16, and operatively, though not electrically, integral with actuating bar 16.

Figure 1A:
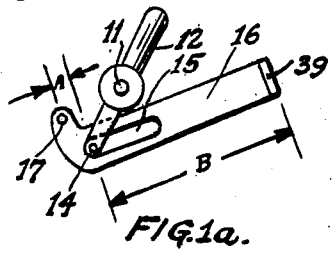
Fig. 1a is a force diagram thereof.
Figure 2:
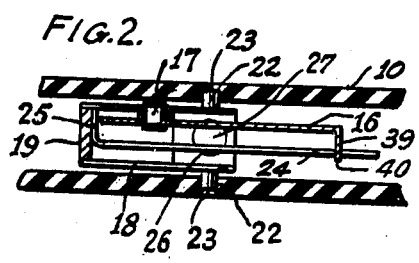
Fig. 2 is a fragmentary section on line 2—2 of Fig. 1.

It will also be observed that moment arm A (Fig. 1a) is very small as compared to moment arm B. This results in a comparatively light reaction or pressure on the thermal latch, despite a heavy reaction or pressure on the contact arm.

It will be observed that the breaker hereof is so constructed that the controller 24 forms part of the movable mechanism of the breaker, being part of the movable cradle. The breaker hereof may be distinguished from heretofore known breakers having their controllers formed as parts of the movable mechanism in that its snap action spring 28 provides a quick make and break operation for all movements of the breaker parts.

Figure 4:
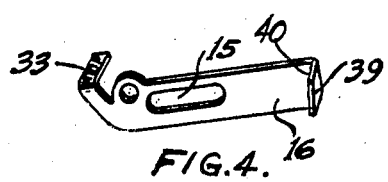
Fig. 4 shows the actuating bar of the breaker.
Figure 5:
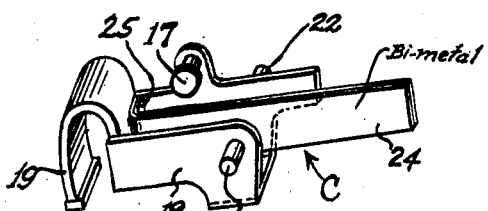
Fig. 5 shows the cradle proper or contact arm and the trip control element of the breaker forming a cradle.

It will also be observed that the actuating bar 16 and the cradle, including the cradle proper 18, movable contact 19, and controller 24, and their pivotal connection 17, may all be assembled relatively to form a unit which can be calibrated by calibration of the controller 24 with respect to the actuating bar 16 long prior to the assembly of the parts within the breaker casing and that assembly of the entire unit, namely the parts shown in Figs. 4 and 5, as a unit, may be effected merely by disposing the unit within the casing in proper manner.

If there is an opening in the bottom of the casing, such as the opening 41, a pry instrument might be inserted through such opening and might engage the controller 24, thus controlling the tripping of the breaker, regardless of circuit conditions. If desired, this result may be prevented from occurring by providing an extension, such as the one shown at 42, Fig. 1, on the cradle proper, to underlie the entire length of the controller and thus make it inaccessible through such opening in the bottom of the casing. In this manner manual control of the tripping of the breaker may be prevented, with the result that tripping will occur only in response to circuit conditions.

If desired, and as shown in Figs. 8 and 9, the controller 24 need not be in form of a bimetal warping element, but may be in the form of a leaf spring adapted to be moved for releasing the cradle from the actuating bar by a supplementary controller such as the bimetal element 43 shown in Figs. 8 and 9. This element has its lower end anchored to a binding post 44 and has its upper end positioned to engage the free end of the controller 24 for the purposes described. In a construction of this character the circuit will be established from the binding post 44 to the binding post 34 through the bimetal element 43 and through a flexible connection 45 which connects the free end of the bimetal element directly to the stationary contact 19, by passing the leaf spring 24.

In the breaker of Figs. 10 to 14 the parts are so arranged that on a trip release movement of the trip control element 24, the spring 28 immediately urges the cradle or contact arm 18 upwardly to the position of Fig. 12, movement of the actuating bar being terminated by the engagement of the end of the actuating bar 16 with the stop 50 and by the engagement of the warping element 24 with the stop 31, this condition of the parts being illustrated in Fig. 12 which shows the parts following the first part of the trip movement, with the circuit open.

At this time the spring 28 continues its action and acting through the pivot 17, the actuating bar 16, and the handle finger 14 rocks the actuating bar and the handle as a bell crank around the handle finger 14 as a pivot, counterclockwise, to throw the handle and actuating bar 16 into the final trip or "off" position of Fig. 11. This action automatically resets all of the parts of the breaker, and particularly the handle, into the normal "off" position, following overload release. In this way there is eliminated the necessity, which exists in the case of the breakers of Figs. 1 to 9 inclusive, of moving the handle following trip release, out of the trip position into the "off" position in order to reset the parts. In the breaker of Figs. 10 to 14 such reset into "off" position is accomplished automatically whereas in the breakers of Figs. 1 to 9 such reset of the handle into "off" position is accomplished manually by a supplemental movement which need not be given the handle in the case of the breaker of Figs. 10 to 14.

While the casings herein are shown as formed of one piece, it is obvious that for purposes of assembly the casings will be split and formed of one or more pieces, to the extent necessary; and since the formation of a casing in two pieces rather than one is within the skill of a mechanic, for purposes of clarity the casings are here shown as of one piece. Similarly, and for similar reasons, no openings for circuit wires are shown.

The elements shown in the drawings and referenced B, disposed in angular relation and having a space between them through which contact 19 passes, form barriers for preventing escape of gases from the point of contact separation to the interior of the casing where the mechanism is located.

Now having described the breakers hereof, reference will be had to the claims which follow for a determination of the protection sought herein.

I claim:

1. A circuit breaker comprising a contact arm, a circuit condition responsive trip control element or latch having an inherent characteristic to move in response to circuit conditions, a movably mounted actuating bar pivotally connected to said contact arm and positioned to be interlocked to the arm by the element when the latter is under normal circuit influence, or to be released thereby when the latter is under abnormal circuit influence, so as not to be interlocked to the arm, a spring acting directly on said arm and thus acting on the unit formed of said arm and actuating bar when these are interlocked relatively, and a handle for acting directly on the actuating bar and thus acting on the unit formed of said arm and actuating bar when these are interlocked relatively, the arm and actuating bar being arranged to be interlocked and thus move as a unit during normal circuit conditions and to be free of one another and thus move separately and relatively during abnormal circuit conditions, the arm, the element, and the actuating bar comprising elongated members arranged so as to be generally alongside one another, and to move generally along with one another, together or independently as the case may be, the handle and spring being on opposite sides of the group comprising the arm, the element, and the actuating bar, the handle and spring also being separate from and independent of each other and operating independently of each other.

2. A circuit breaker comprising a contact arm, a circuit condition responsive trip control element or latch having an inherent characteristic to move in response to circuit conditions, a movably mounted actuating bar pivotally connected to said contact arm and positioned to be interlocked to the arm by the element when the latter is under normal circuit influence, or to be released thereby when the latter is under abnormal circuit influence, so as not to be interlocked to the arm, a spring acting directly on said arm and thus acting on the unit formed of said arm and actuating bar when these are interlocked relatively, and a handle for acting directly on the actuating bar and thus acting on the unit formed of said arm and actuating bar when these are interlocked relatively, the arm and actuating bar being arranged to be interlocked and thus move as a unit during normal circuit conditions and to be free of one another and thus move separately and relatively during abnormal circuit conditions, the parts being so arranged that on the arising of a circuit abnormality, the element moves to release the actuating bar from the arm, whereupon the spring moves the contact arm independently of the actuating bar and of the handle, the arm, the element, and the actuating bar comprising elongated members arranged so as to be generally alongside one another, and to move generally along with one another, together or independently as the case may be, the handle and spring being on opposite sides of the group comprising the arm, the element, and the actuating bar, the handle and spring also being separate from and independent of each other and operating independently of each other.

3. A circuit breaker comprising a contact arm, a circuit condition responsive trip control element or latch having an inherent characteristic to move in response to circuit conditions, a movably mounted actuating bar pivotally connected to said contact arm and positioned to be interlocked to the arm by the element when the latter is under normal circuit influence, or to be released thereby when the latter is under abnormal circuit influence, so as not to be interlocked to the arm, a spring acting directly on said arm and thus acting on the unit formed of said arm and actuating bar when these are interlocked relatively, and a handle for acting directly on the actuating bar and thus acting on the unit formed of said arm and actuating bar when these are interlocked relatively, the arm and actuating bar being arranged to be interlocked and thus move as a unit during normal circuit conditions and to be free of one another and thus move separately and relatively during abnormal circuit conditions, the parts being so arranged that on the arising of a circuit abnormality, the element moves to release the actuating bar from the arm, whereupon the spring moves the contact arm independently of the actuating bar and of the handle, after which the spring once more creates an interlocking relation between the contact arm and the actuating bar, the arm, the element, and the actuating bar comprising elongated members arranged so as to be generally alongside one another, and to move generally along with one another, together or independently as the case may be, the handle and spring being on opposite sides of the group comprising the arm, the element, and the actuating bar, the handle and spring also being separate from and independent of each other and operating independently of each other.

4. A circuit breaker comprising a contact arm, a circuit condition responsive trip control element or latch having an inherent characteristic to move in response to circuit conditions, a movably mounted actuating bar pivotally connected to said contact arm and position to be interlocked to the arm by the element when the latter is under normal circuit influence, or to be released thereby when the latter is under abnormal circuit influence, so as not to be interlocked to the arm, a spring acting directly on said arm and thus acting on the unit formed of said arm and actuating bar when these are interlocked relatively, and a handle for acting directly on the actuating bar and thus acting on the unit formed of said arm and actuating bar when these are interlocked relatively, the arm and actuating bar being arranged to be interlocked and thus move as a unit during normal circuit conditions and to be free of one another and thus move separately and relatively during abnormal circuit conditions, the parts being so arranged that on the arising of a circuit abnormality, the element moves to release the actuating bar from the arm, whereupon the spring moves the contact arm independently of the actuating bar and of the handle, after which the spring once more creates an interlocking relation between the contact arm and the actuating bar, the handle being connected to the actuating bar so that it may move therewith when the latter is moved by the spring, the arm, the element, and the actuating bar comprising elongated members arranged so as to be generally alongside one another, and to move generally along with one another, together or independently as the case may be, the handle and spring being on opposite sides of the group comprising the arm, the element, and the actuating bar, the handle and spring also being separate from and independent of each other and operating independently of each other.

5. A circuit breaker comprising a contact arm, a circuit condition responsive trip control element or latch having an inherent characteristic to move in response to circuit conditions, a movably mounted actuating bar pivotally connected to said contact arm and positioned to be interlocked to the arm by the element when the latter is under normal circuit influence, or to be released thereby when the latter is under abnormal circuit influence, so as not to be interlocked to the arm, a spring acting directly on said arm and thus acting on the unit formed of said arm and actuating bar when these are interlocked relatively, and a handle for acting directly on the actuating bar and thus acting on the unit formed of said arm and actuating bar when these are interlocked relatively, the arm and actuating bar being arranged to be interlocked and thus move as a unit during normal circuit conditions and to be free of one another and thus move separately and relatively during abnormal circuit conditions, the element being in the operative and interlocking connection between the arm and actuating bar, and being formed as part of the contact arm, the arm the element, and the actuating bar comprising elongated members arranged so as to be generally alongside one another, and to move generally along with one another, together or independently as the case may be, the handle and spring being on opposite sides of the group comprising the arm, the element, and the actuating bar, the handle and spring also being separate from and independent of each other and operating independently of each other.

6. A circuit breaker comprising a contact arm, a circuit condition responsive trip control element or latch having an inherent characteristic to move in response to circuit conditions, a movably mounted actuating bar pivotally connected to said contact arm and positioned to be interlocked to the arm by the element when the latter is under normal circuit influence, or to be released thereby when the latter is under abnormal circuit influence, so as not to be interlocked to the arm, a spring acting directly on said arm and thus acting on the unit formed of said arm and actuating bar when these are interlocked relatively, and a handle for acting directly on the actuating bar and thus acting on the unit formed of said arm and actuating bar when these are interlocked relatively, the arm and actuating bar being arranged to be interlocked and thus move as a unit during normal circuit conditions and to be free of one another and thus move separately and relatively during abnormal circuit conditions, the element being in the operative and interlocking connection between the arm and actuating bar, and being formed as part of the contact arm, the arm, element, and actuating bar being so arranged that they may be assembled into a unit outside the breaker and assembled as a unit in the breaker in cooperative relation with the handle and spring, the arm, the element, and the actuating bar comprising elongated members arranged so as to be generally alongside one another, and to move generally along with one another, together or independently as the case may be, the handle and spring being on opposite sides of the group comprising the arm, the element, and the actuating bar, the handle and spring also being separate from and independent of each other and operating independently of each other.

7. A circuit breaker comprising a contact arm, a circuit condition responsive trip control element or latch having an inherent characteristic to move in response to circuit conditions, a movably mounted actuating bar pivotally connected to said contact arm and positioned to be interlocked to the arm by the element when the latter is under normal circuit influence, or to be released thereby when the latter is under abnormal circuit influence, so as not to be interlocked to the arm, a spring acting directly on said arm and thus acting on the unit formed of said arm and actuating bar when these are interlocked relatively, and a handle for acting directly on the actuating bar and thus acting on the unit formed of said arm and actuating bar when these are interlocked relatively, the arm and actuating bar being arranged to be interlocked and thus move as a unit during normal circuit conditions and to be free of one another and thus move separately and relatively during abnormal circuit conditions, the element being in the operative and interlocking connection between the arm and actuating bar, and being formed as part of the contact arm, the element comprising a bimetal warping element having one end fastened to the arm and being in circuit with the contact part of said arm, the arm, the element, and the actuating bar comprising elongated members arranged so as to be generally alongside one another, and to move generally along with one another, together or independently as the case may be, the handle and spring being on opposite sides of the group comprising the arm, the element, and the actuating bar, the handle and spring also being separate from and independent of each other and operating independently of each other.

8. A butt pressure contact circuit breaker including a movable butt contact, a stationary contact, a movable contact operating arm, a handle, and a thermally responsive latch for said arm, and a single spring for butt pressing the movable contact against the stationary contact when the parts are in circuit closed position, and for biasing the movable contact away from the stationary contact when the arm is released by the latch, the spring being connected to the contact operating arm free and independently of the handle, the latching being formed as an extended part of the arm, the breaker also having an actuating bar forming the operative connection between the handle and the contact arm.

9. A butt pressure contact circuit breaker and manually operable switch including a breaker frame, a movable butt contact, a stationary contact, a movable contact operating arm, a handle, and a thermally responsive latch for said arm, the handle and movable contact being so connected that movement of the handle in one direction causes the movable contact to withdraw from the stationary contact, and movement of the handle in the opposite direction causes the movable contact to approach the stationary contact, and a single overcenter spring for butt pressing the movable contact against the stationary contact when the parts are in circuit closed position, and for biasing the movable contact away from the stationary contact when the arm is released by the latch, and for causing snap movement of the movable contact to its resting point in "off" position, the spring being connected to the contact operating arm free and independently of the handle, the breaker also having an actuating bar forming the operative connection between the handle and the contact arm.

10. A butt pressure contact circuit breaker and manually operable switch including a breaker frame, a movable butt contact, a stationary contact, a movable contact operating arm, a handle, and a thermally responsive latch for said arm, the handle and movable contact being so connected that movement of the handle in one direction causes the movable contact to withdraw from the stationary contact, and movement of the handle in the opposite direction causes the movable contact to approach the stationary contact, and a single overcenter spring for butt pressing the movable contact against the stationary contact when the parts are in circuit closed position, and for biasing the movable contact away from the stationary contact when the arm is released by the latch, and for causing snap movement of the movable contact to its resting point in "off" position, the spring being connected to the contact operating arm free and independently of the handle, and also being operatively connected to the breaker frame, the breaker also having an actuating bar forming the operative connection between the handle and the contact arm.

11. A butt pressure contact circuit breaker and manually operable switch including a breaker frame, a movable butt contact, a stationary contact, a movable contact operating arm, a handle, and a thermally responsive latch for said arm, the handle and movable contact being so connected that movement of the handle in one direction causes the movable contact to withdraw from the stationary contact, and movement of the handle in the opposite direction causes the movable contact to approach the stationary contact, and a single overcenter spring for butt pressing the movable contact against the stationary contact when the parts are in circuit closed position, and for biasing the movable contact away from the stationary contact when the arm is released by the latch, and for causing snap movement of the movable contact to its resting point on "off" position, the spring being connected to the contact operating arm free and independently of the handle, the breaker also having an actuating bar forming the operative connection between the handle and the contact arm, the latch being formed as an extended part of the arm.

12. An overload release circuit breaker and manually operable switch comprising a handle, a stationary contact, a movable contact arm, an overload release latch for latching the handle and the arm, and an operating spring, the parts being so arranged that when the latch is held manual movement of the handle in one direction causes the arm to move out of "on" position and away from the stationary contact into "off" position, and manual movement of the handle in the opposite direction causes the arm to move out of "off" position towards the stationary contact, and into "on" position, with overload release of the latch permitting the spring to move the contact arm away from the stationary contact, and with manual movement of the handle thereafter first causing a relatching of the handle and arm before the arm can be caused to enter the "on" position, whereby the connection between the arm and handle is thereafter under the control of the latch, the breaker including an actuating bar separate from the handle and the contact arm for forming the operative connection between the handle and the contact arm.

13. An overload release circuit breaker and manually operable switch comprising a handle, a stationary contact, a movable contact arm, an overload release latch for latching the handle and the arm, and an operating spring, the parts being so arranged that when the latch is held manual movement of the handle in one direction causes the arm to move out of "on" position and away from the stationary contact into "off" position, and manual movement of the handle in the opposite direction causes the arm to move out of "off" position towards the stationary contact, and into "on" position, with overload release of the latch permitting the spring to move the contact arm away from the the stationary contact, and with manual movement of the handle thereafter first causing a relatching of the handle and arm before the arm can be caused to enter the "on" position, whereby the connection between the arm and handle is thereafter under the control of the latch, the arm and handle, when relatively latched, moving as a unit, with at least part of each movement being influenced by the spring for snap action of the arm into its final resting place in "on" or "off" position, the breaker including an actuating bar separate from the handle and the contact arm for forming the operative connection between the handle and the contact arm.

ELWOOD T. PLATZ.